（12）United States Patent
Atsuta et al.

(10) Patent No.: US 12,468,286 B2
(45) Date of Patent: Nov. 11, 2025

(54) MOLDING MANAGEMENT APPARATUS

(71) Applicant: SEIKO EPSON CORPORATION, Tokyo (JP)

(72) Inventors: Kosuke Atsuta, Nagano (JP); Hiroki Minowa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 17/817,360

(22) Filed: Aug. 4, 2022

(65) Prior Publication Data

US 2023/0039170 A1 Feb. 9, 2023

(30) Foreign Application Priority Data

Aug. 6, 2021 (JP) ................... 2021-129619

(51) Int. Cl.
*G05B 19/4155* (2006.01)
(52) U.S. Cl.
CPC .......... *G05B 19/4155* (2013.01); *G05B 2219/45244* (2013.01)
(58) Field of Classification Search
None
See application file for complete search history.

(56) References Cited

U.S. PATENT DOCUMENTS

| | | | | |
|---|---|---|---|---|
| 4,734,869 A | * | 3/1988 | Mickowski | ........... G01L 1/2256 |
| | | | | 345/440.1 |
| 2004/0093115 A1 | * | 5/2004 | Usui | ................. B29C 45/768 |
| | | | | 700/109 |

FOREIGN PATENT DOCUMENTS

| | | |
|---|---|---|
| JP | H07-24894 A | 1/1995 |
| JP | H08-022494 A | 1/1996 |

* cited by examiner

*Primary Examiner* — Sean Shechtman
(74) *Attorney, Agent, or Firm* — Global IP Counselors, LLP

(57) ABSTRACT

A molding management apparatus includes an operation section as a selection section that selects an objective variable, a correlation calculation section that calculates a correlation between time series data corresponding to an objective variable and a plurality of time series data sets corresponding to explanatory variables describing the objective variable, and a display section for displaying a plurality of time series data sets corresponding to the explanatory variable in a display mode based on correlation, and displaying the time series data corresponding to the objective variable and the plurality of time series data sets corresponding to the explanatory variable displayed in a display mode based on correlation along a common time axis.

7 Claims, 7 Drawing Sheets

| DEFECT TYPE | EXPLANATORY VARIABLES |
|---|---|
| FILLING DEFECT | RESIN TEMPERATURE, METAL MOLD TEMPERATURE, CONTINUOUS VALUE, RESIN PRESSURE, MAXIMUM INJECTION PRESSURE |
| FLOW MARK | INJECTION PRESSURE, MAXIMUM INJECTION PRESSURE, INJECTION SPEED, CONTINUOUS VALUE, INJECTION MOST ADVANCED POSITION, RESIN TEMPERATURE |
| ⋮ | ⋮ |

MOLDING MANAGEMENT APPARATUS

The present application is based on, and claims priority from JP Application Serial Number 2021-129619, filed Aug. 6, 2021, the disclosure of which is hereby incorporated by reference herein in its entirety.

BACKGROUND

1. Technical Field

The present disclosure relates to a molding management apparatus.

2. Related Art

In the related art, as shown in JP-A-7-24894, there is known an injection molding support apparatus which, when forming defects occur in a molded article, refers to a forming defect countermeasure matrix and sequentially derives a plurality of countermeasures against forming defects.

However, there is a possibility that the molding defect of the molded article is not improved merely by the injection molding support device referring to the molding defect countermeasure matrix as in JP-A-7-24894.

Therefore, there is a need for a molding management apparatus capable of easily analyzing the cause of molding defects of a molded article.

SUMMARY

A molding management apparatus configured to connect to a molding apparatus that produces a molded article includes a selection section for selecting an objective variable, a correlation calculation section for calculating a correlation between time series data corresponding to the objective variable and a plurality of time series data sets corresponding to explanatory variables for explaining the objective variable, a display section that displays the plurality of time series data sets corresponding to the explanatory variables in a display mode based on the correlation and that displays, along a common time axis, the time series data corresponding to the objective variable and the plurality of time series data sets corresponding to the explanatory variables displayed in the display mode.

BRIEF DESCRIPTION OF THE DRAWINGS

FIG. 6 is a table showing correspondence between defect types and explanatory variables according to the third embodiment.

DESCRIPTION OF EMBODIMENTS

1. First Embodiment

Overall configuration of a molding management system 10 including a molding management apparatus 500 according to a first embodiment will be described with reference to FIG. 1.

Figure 1:
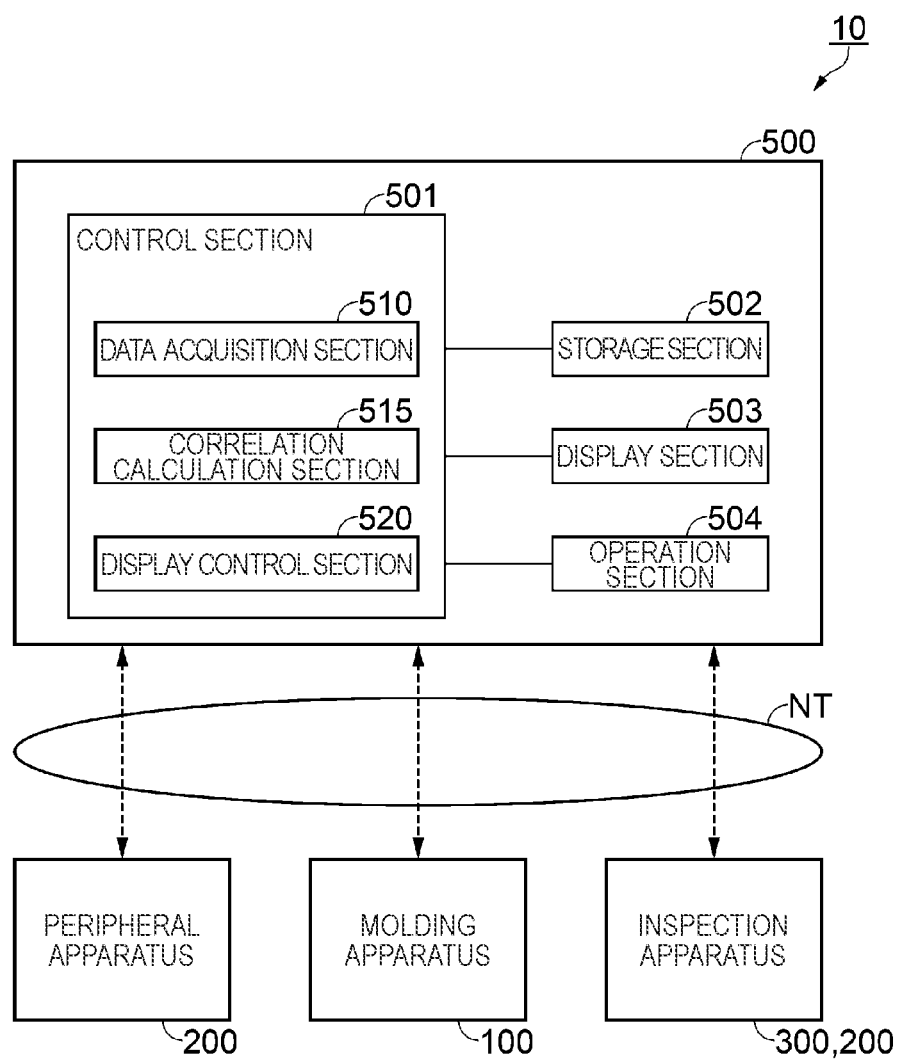
FIG. 1 is an explanatory diagram showing a schematic configuration of a molding management system including a molding management apparatus according to a first embodiment.

As shown in FIG. 1, the molding management system 10 includes a molding apparatus 100, a peripheral apparatus 200, and a molding management apparatus 500.

The molding apparatus 100 is an apparatus for producing a molded article.

The peripheral apparatus 200 is an apparatus used with the molding apparatus 100 for production of the molded article. The peripheral apparatus 200 includes an inspection apparatus 300 for inspecting the molded article produced by the molding apparatus 100. Examples of the peripheral apparatus 200 include the inspection apparatus 300 and also a dryer that dries a resin or the like that is the material of the molded article, a temperature adjuster that performs temperature adjustment of a metal mold included in the molding apparatus 100, a transport apparatus that takes the molded article out from the metal mold and conveys the molded article to the inspection apparatus 300 or the like, and a processing apparatus that removes gate cuts, burrs, or the like from the molded article.

The molding apparatus 100 and the peripheral apparatus 200 may be collectively referred to as an industrial machine. That is, the industrial machine is a concept including the molding apparatus 100 and the peripheral apparatus 200.

The molding apparatus 100 and the molding management apparatus 500 are communicably connected to each other. The peripheral apparatus 200 and the molding management apparatus 500 are communicably connected to each other. In the present embodiment, the molding management apparatus 500 communicates with the molding apparatus 100 and the peripheral apparatus 200 via a network NT to execute transmission and reception of data with the molding apparatus 100 and the peripheral apparatus 200. The network NT may be either a local area network (LAN) or the Internet.

Next, the molding apparatus 100 will be described.

In this embodiment, the molding apparatus 100 is, for example, an injection molding apparatus. The molding apparatus 100 includes a molding control section, an injection apparatus, and a mold clamping apparatus, none of which are illustrated. A hopper for storing resin or the like, which is a material of the molded article, is mounted on the injection apparatus. A molding die is mounted on the mold clamping apparatus. The molding die may be made of metal, ceramic, or resin. The molding die made from metal is referred to as a metal mold.

The molding control section includes one or a plurality of processors, a storage device, and an interface that inputs and outputs signals to and from the outside.

According to a molding program, the molding control section controls the mold clamping apparatus to clamp the molding die, controls the hopper to supply the material from the hopper to the injection apparatus, and controls the injection apparatus to plasticize the material and inject the material into the molding die. In this way, the molding apparatus 100 produces the molded article having a shape corresponding to the cavity of the molding die.

The molding program is a program for performing injection molding one time in the molding apparatus 100. The molding program instructs the molding apparatus 100 about molding conditions such as a change timing of a control value of the injection apparatus, the mold clamping apparatus, or the like, and a magnitude of the control value.

The molding control section causes the molding apparatus 100 to execute the injection molding cycle for the number of times corresponding to the scheduled production number, thereby molding the molded article for the scheduled production number. One injection molding cycle is referred to as a shot.

The molding control section acquires various actual measurement values in the molding apparatus 100 by using a sensor (not illustrated) provided in the molding apparatus 100, and transmits the various actual measurement values acquired by using the sensor to the molding management apparatus 500. Examples of the sensor include a weight sensor that detects the weight of the material stored in the hopper, a pressure sensor that detects the pressure of the material, gas, or the like inside the injection device or the molding die, and a temperature sensor that detects the temperature of the injection device or the molding die. Various actual measurement values acquired by the molding control section using the sensor are associated with the time at which the actual measurement values is measured or the number of shots.

Next, the inspection apparatus 300 will be described as an example of the peripheral apparatus 200.

In this embodiment, the inspection apparatus 300 is, for example, an image inspection apparatus. The inspection apparatus 300 includes an inspection control section and an imaging device that is the sensor, which are not illustrated.

The inspection control section includes one or a plurality of processors, a storage device, and an interface for inputting and outputting signals to and from the outside. The inspection control section controls the imaging device to capture an image of the molded article produced by the molding apparatus 100, and analyzes the captured image of the molded article to perform a dimensional inspection and an appearance inspection of the molded article.

The inspection control section acquires the actual measurement value of a dimension of the molded article and an inspection result of a dimension inspection and an appearance inspection of the molded article. The actual measurement value of the dimension of the molded article acquired by the inspection control section and the inspection result of the dimension inspection and the appearance inspection of the molded article are associated with the number of shots or the time at which the inspection of the molded article is performed. Further, the inspection results of the dimensional inspection and the appearance inspection of the molded article are associated with a defect type of the molded article. The defect types of the molded article include a dimensional defect and an appearance defect. Examples of the defect type of the molded article include, for example, filling defects (short shot), flow marks, silver streaks, jetting, sink marks, and whitening.

The inspection control section transmits the actual measurement value of the dimension of the molded article and the results of the dimension inspection and the appearance inspection of the molded article to the molding management apparatus 500.

As described above, examples of a peripheral apparatus 200 other than the inspection apparatus 300 include a dryer, a temperature regulator, a transport apparatus, and a processing apparatus. For example, the dryer includes a control section that controls the dryer and the sensor that measures various actual measurement values of the dryer. The control section that controls the dryer transmits various actual measurement values acquired using the sensor to the molding management apparatus 500. Similar to the dryer, each of the temperature regulator, the transport apparatus, and the processing apparatus includes a control section that controls each apparatus and the sensor that is provided in each device. The control section that controls each apparatus transmits various actual measurement values acquired by using the sensor to the molding management apparatus 500. Various actual measurement values acquired using the sensor are associated with the time at which the actual measurement values is measured or the number of shots.

Next, the molding management apparatus 500 will be described with reference to FIGS. 1, 2, and 3.

First, a schematic configuration of the molding management apparatus 500 will be described with reference to FIG. 1, and then a correlation calculation section 515 and a display control section 520 included in the molding management apparatus 500 will be described with reference to FIGS. 2 and 3.

As shown in FIG. 1, the molding management apparatus 500 includes a control section 501, a storage section 502, a display section 503, and an operation section 504. As the molding management apparatus 500, for example, an information processing apparatus such as a computer can be used.

The control section 501 is, for example, an integrated circuit such as a central processing unit (CPU) or a micro processing unit (MPU).

The storage section 502 is, for example, a volatile memory such as a random access memory (RAM), a non-volatile memory such as a read only memory (ROM), or a detachable external storage device.

The display section 503 is, for example, a liquid crystal display.

The operation section 504 is, for example, a keyboard, a mouse, a touch panel, or the like. Note that the operation section 504 and the display section 503 may be integrated as in a touch panel display. In the present embodiment, the operation section 504 and the display section 503 are integrated with the molding management apparatus 500, but the operation section 504 and the display section 503 may be a terminal device independent of the molding management apparatus 500. As the terminal device, for example, a tablet terminal or a smartphone can be used.

An operator can select an objective variable, to be described later, via the operation section 504. That is, the operation section 504 functions as a selection section that selects an objective variable.

In addition, the operator can input 4 element information regarding production 4 elements for producing the molded article to the molding management apparatus 500 via the operation section 504. The "production 4 elements" are the four elements of man, machine, material, and method. "Man" means a person involved in production of the molded article, such as an operator in charge of operation of the molding apparatus 100 or an operator in charge of inspection by the inspection apparatus 300. "Machine" means a machine used for production of the molded article, such as the molding apparatus 100 or the peripheral apparatus 200 including the inspection apparatus 300. That is, in the present embodiment, "machine" means an industrial machine including the molding apparatus 100 and the peripheral apparatus 200. "Material" means the material of the molded article. "Method" means, for example, a method of producing the molded article, such as an injection molding method, or a method of inspecting the molded article. The 4 element information may be associated with the defect type of the molded article. The production 4 elements may be referred to as 4M, and the 4 element information may be referred to as 4M information.

In the present embodiment, the 4 element information is input to the molding management apparatus 500 by the operator, but at least a part of the 4 element information may be input to an apparatus other than the molding management apparatus 500 and transmitted from the apparatus other than the molding management apparatus 500 to the molding management apparatus 500. For example, at least part of the 4 element information may be input to the molding apparatus 100 and transmitted from the molding apparatus 100 to the molding management apparatus 500.

The molding management apparatus 500 includes a data acquisition section 510, the correlation calculation section 515, and the display control section 520 for controlling the display section 503. The data acquisition section 510, the correlation calculation section 515, and the display control section 520 are realized by the control section 501 executing a program stored in the storage section 502. These may be realized by circuitry.

The data acquisition section 510 acquires the various actual measurement values transmitted from the molding apparatus 100, and stores the acquired various actual measurement values in the storage section 502 in time series. In this way, time series data of the actual measurement values in the molding apparatus 100 are stored in the storage section 502.

The data acquisition section 510 acquires the actual measurement value of the dimension of the molded article transmitted from the inspection apparatus 300 and the inspection results of the dimension inspection and the appearance inspection of the molded article, and stores the acquired actual measurement value of the dimension of the molded article and the inspection results of the dimension inspection and the appearance inspection of the molded article in the storage section 502 in time series order. In this manner, the respective time series data of the actual measurement value of the dimension of the molded article and the inspection results of the dimension inspection and the appearance inspection of the molded article are stored in the storage section 502.

The data acquisition section 510 acquires various measured values transmitted from the peripheral apparatus 200 other than the inspection apparatus 300, and stores the acquired various actual measurement values in the storage section 502 in time series order. In this manner, time series data of actual measurement values in the peripheral apparatus 200 other than the inspection apparatus 300 are stored in the storage section 502.

The data acquisition section 510 acquires the 4 element information input to the molding management apparatus 500, and stores the acquired 4 element information in the storage section 502 in time series order. In this way, time series data of the 4 element information is stored in the storage section 502.

Various actual measurement values transmitted from the molding apparatus 100, an actual measurement value of a dimension of the molded article transmitted from the inspection apparatus 300, and various actual measurement values transmitted from the peripheral apparatus 200 other than the inspection apparatus 300 may be collectively referred to as actual measurement values of an industrial machine. The actual measurement values of the industrial machine may include categorical data in addition to numerical data such as these actual measurement values. One example of categorical data is information about the appearance of the molded article. The information on the appearance of the molded article is data representing the appearance of the molded article on an ordinal scale. The data expressing the appearance of the molded article in the ordinal scale is data indicating a magnitude relation or an order relation of respective inspection results such as "there is no flow mark", "there is a small flow mark", and "there is a large flow mark" as the inspection result of the appearance inspection of the molded article. The categorical data may be any dummy variable indicating an ordinal scale. Quantity data such as actual measurement values may be converted into categorical data. The categorical data also includes the 4 element information relating to the production 4 elements for producing the molded article.

The actual measurement value of the dimension of the molded article transmitted from the inspection apparatus 300 and the inspection results of the dimension inspection and the appearance inspection of the molded article may be collectively referred to as information related to the quality of the molded article. The information related to the quality of the molded article is information related to the dimensions and appearance of the molded article, and includes, for example, the number of defects and the defect rate for each defect type, the total number of defects and the total defect rate without limiting the defect type, the dimensions of the molded article, the variation amount and the variation rate of the dimensions, the variation amount and the variation rate of the geometric tolerance of the molded article, and the like.

Next, the correlation calculation section 515 and the display control section 520 included in the molding management apparatus 500 will be described with reference to FIGS. 2 and 3.

Figure 2:
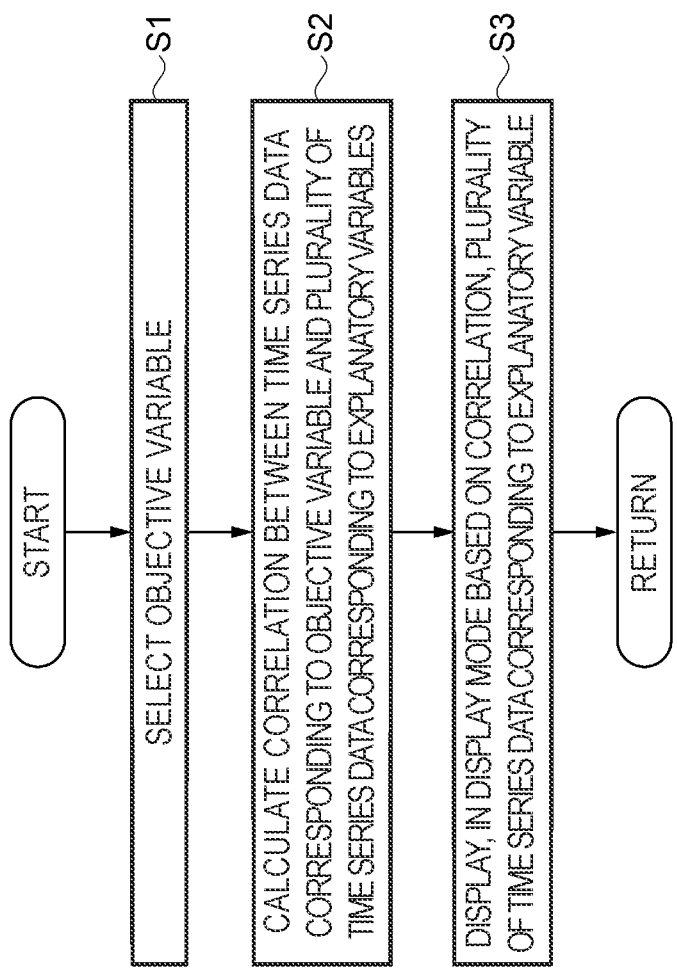
FIG. 2 is a flowchart showing a data processing method of the molding management apparatus according to the first embodiment.

As shown in FIG. 2, the data processing method of the molding management apparatus 500 includes step S1, which is a step of selecting an objective variable, step S2, which is a step of calculating a correlation between time series data corresponding to the objective variable and a plurality of time series data sets corresponding to explanatory variables, and step S3, which is a step of displaying the plurality of time series data sets corresponding to the explanatory variables in a display mode based on the correlation. "Objective variable" and "explanatory variable" are statistical terms. In the present embodiment, "objective variable" means a variable that an operator wants to monitor or predict, and "explanatory variable" means a variable that explains the objective variable.

In step S2, the correlation calculation section 515 calculates a correlation between the time series data corresponding to the objective variable and the plurality of time series data sets corresponding to the explanatory variable.

In step S3, the display control section 520 controls the display section 503 to display a plurality of time series data sets corresponding to the explanatory variables in a display mode based on correlation.

Step S1 is a process of selecting an objective variable. As described above, the operator can select an objective variable via the operation section 504 as a selection section.

In this embodiment, the objective variable is information relating to the quality of the molded article. In the following description, for convenience of explanation, it is assumed that an actual measurement value of the dimension of the molded article is selected as the objective variable in step S1. The actual measurement value of the dimension of the molded article is an example of information related to the quality of the molded article.

In the present embodiment, the operator selects the objective variable, but the present disclosure is not limited thereto, and the molding management apparatus 500 may automatically select the objective variable. For example, the control section 501 of the molding management apparatus 500 may select the actual measurement value of the dimension of the molded article as the objective variable when, among the information related to the quality of the molded article, the number of occurrences of abnormality in the time series data corresponding to the actual measurement value of the dimension of the molded article exceeds a predetermined number. By comparing the actual measurement value of the dimension of the molded article with the drawing standard of the molded article, the presence or absence of abnormality in the actual measurement value of the dimension of the molded article can be determined. Further, for example, the control section 501 of the molding management apparatus 500 may select the total defect rate of the molded article as the objective variable when, among the information on the quality of the molded article, the number of occurrences of abnormality in the time series data corresponding to the total defect rate of the molded article exceeds a predetermined number of times. By comparing the overall defect rate of the molded article with the target yield of the molded article, it is possible to determine the presence or absence of an abnormality in the overall defect rate of the molded article. When the molding management apparatus 500 automatically selects the objective variable, the control section 501 of the molding management apparatus 500 functions as the selection section.

Step S2 is a step of calculating a correlation between time series data corresponding to an objective variable and a plurality of time series data sets corresponding to explanatory variables.

The correlation calculation section 515 acquires, from the storage section 502, the time series data corresponding to the objective variable selected in step S1. In the present embodiment, the time series data corresponding to the objective variable is time series data in which actual measurement values of the dimension of the molded article are stored in time series.

The correlation calculation section 515 acquires, from the storage section 502, a plurality of time series data sets corresponding to explanatory variables explaining an objective variable. In the present embodiment, the explanatory variables are actual measurement values of an industrial machine, and are, for example, the maximum injection pressure of the molding apparatus 100, the most advanced position of injection, the filling time, the resin temperature, the metal mold temperature, and the like. In the present embodiment, the plurality of time series data sets corresponding to the explanatory variables are time series data in which actual measurement values of an industrial machine are stored in time series, and, for example, are time series data in which actual measurement values, such as maximum injection pressure of the molding apparatus 100, most advanced position of injection, filling time, and molding die temperature, are stored in time series.

The correlation calculation section 515 calculates a correlation between the time series data corresponding to an objective variable acquired from the storage section 502 and the plurality of time series data sets corresponding to explanatory variables acquired from the storage section 502. For example, the correlation calculation section 515 calculates a correlation between time series data in which actual measurement values of a dimension of the molded article are stored in time series and time series data in which actual measurement values of maximum injection pressure of the molding apparatus 100 are stored in time series. Similarly, the correlation calculation section 515 calculates each correlation between the time series data in which the actual measurement values of the dimension of the molded article are stored in time series and a plurality of time series data sets in which other than the maximum injection pressure of the molding apparatus 100, for example, the resin temperature of the molding apparatus 100 and the like, are stored in time series. In this way, the correlation calculation section 515, while changing the explanatory variable to be combined with the objective variable, calculates correlations between the objective variable and the plurality of explanatory variables, and calculates correlations corresponding to the explanatory variables. "Calculating correlation" means calculating an index indicating the strength of the correlation between the objective variable and the explanatory variable.

In the present embodiment, the correlation calculated by the correlation calculation section 515 is a correlation coefficient. However, the correlation calculated by the correlation calculation section 515 is not limited to a correlation coefficient, and may be a standard deviation, a maximum information coefficient, which is an index indicating the strength of a nonlinear correlation, or the like.

Step S3 is a step of displaying a plurality of time series data sets corresponding to the explanatory variable, in a display mode based on the correlation calculated in step S2.

In the present embodiment, the display mode based on the correlation is a display mode for displaying, from among the plurality of time series data sets corresponding to the explanatory variable, at least one set of time series data selected based on the correlation calculated in step S2. Specifically, the display mode based on correlation is a display mode that displays time series data corresponding to an explanatory variable for which the absolute value of the correlation coefficient calculated in step S2 is larger than a preset reference value. In the following description, for convenience of description, an explanatory variable whose absolute value of the correlation coefficient calculated in step S2 is larger than a preset reference value is the most advanced position of injection of the molding apparatus 100, and time series data of the most advanced position of injection in the molding apparatus 100 is displayed in step S3. The most advanced position of injection of the molding apparatus 100 is an example of actual measurement values of an industrial machine. When there are two or more explanatory variables for which the absolute value of the correlation coefficient calculated in step S2 is larger than the preset reference value, the two or more sets of time series data are displayed in step S3. For example, when the absolute value of the correlation coefficient calculated in step S2 is larger than a preset reference value the two explanatory variables of the most advanced position of injection of the molding apparatus 100 and the resin temperature of the molding apparatus 100, then the corresponding two sets of time series data are displayed in step S3.

The display control section 520 controls the display section 503 to display a plurality of time series data sets corresponding to an explanatory variable in a display mode based on correlation. Further, the display control section 520 controls the display section 503 to display time series data corresponding to an objective variable and a plurality of time series data sets corresponding to explanatory variables along a common time axis.

The display section 503 is controlled by the display control section 520 and displays a plurality of sets of time series data corresponding to explanatory variables in a display mode based on correlation. Further, the display section 503 displays time series data corresponding to the objective variable and a plurality of time series data sets corresponding to the explanatory variables along a common time axis.

Figure 3:
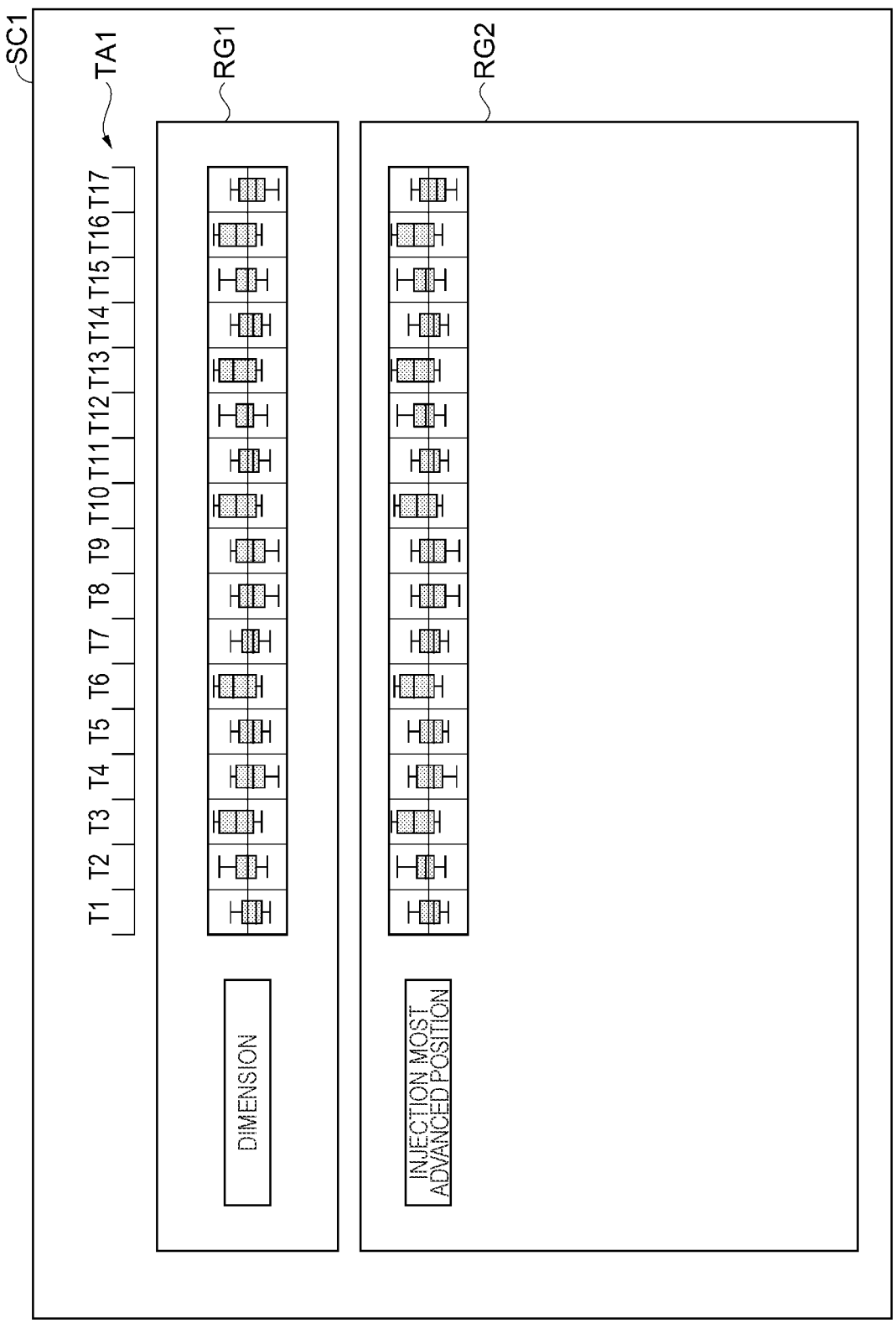
FIG. 3 is an explanatory diagram showing a display screen displayed by a display section according to the first embodiment.

FIG. 3 shows a display screen SC1 displayed by the display section 503 in step S3.

As shown in FIG. 3, a time axis TA1, an objective variable display region RG1, and an explanatory variable display region RG2 are provided on a display screen SC1 in this order from the top. However, the order of these arrangements is arbitrary.

The time axis TA1 is the same axis as the horizontal axis in the objective variable display region RG1 and the explanatory variable display region RG2. In the present embodiment, a label indicating periods T1 to T17 is displayed on the time axis TA1. Note that the time axis TA1 is not limited to time, and may be defined based on information related to the production amount such as the number of shots or the number of lots of the molded article.

In the objective variable display region RG1, time series data corresponding to the objective variable selected in step S1 is displayed. In this embodiment, as described above, since the actual measurement value of the dimension of the molded article is selected in step S1 as an example of the objective variable, time series data corresponding to the actual measurement value of the dimension of the molded article is displayed in the objective variable display region RG1.

In the explanatory variable display region RG2, time series data sets corresponding to explanatory variables is displayed in a display mode based on the correlation calculated in step S2. In this embodiment, as described above, the display mode based on the correlation is a display mode that displays at least one set of time series data selected based on the correlation calculated in step S2. Specifically, time series data corresponding to the most advanced position of injection of the molding apparatus 100, which is an explanatory variable whose absolute value of the correlation coefficient is larger than a predetermined reference value, is displayed in the explanatory variable display region RG2.

In this manner, in the explanatory variable display region RG2, the time series data corresponding to the explanatory variable is displayed in a display mode based on the correlation calculated in step S2, and thus the operator can easily grasp the explanatory variable correlated with the objective variable. Therefore, the operator can easily analyze the cause of the molding defect of the molded article.

The time series data corresponding to the objective variables displayed in the objective variable display region RG1 and in the explanatory variable display region RG2 and the time series data corresponding to the explanatory variable displayed in the explanatory variable display region RG2 are displayed along a time axis TA1, which is a common time axis. Thus, the operator can easily compare the time series data corresponding to the objective variable and the time series data corresponding to the explanatory variable according to the time series, and can accurately grasp the correlation between the objective variable and the explanatory variable. Therefore, the operator can accurately analyze the cause of the molding defect of the molded article.

Further, since the display mode based on the correlation is a display mode for displaying at least one time series data set selected based on the correlation calculated in step S2, the operator can more easily grasp the explanatory variable correlated with the objective variable.

As described above, in the present embodiment, the objective variable is information related to the quality of the molded article, and the explanatory variable is an actual measurement value of an industrial machine related to the production of the molded article. In general, in order to monitor the quality of the molded article in the production of the molded article, a cause of a molding defect of the molded article can be easily analyzed by using an objective variable as information related to the quality of the molded article.

In the present embodiment, the explanatory variable is actual measurement values of an industrial machine related to production of the molded article, but the explanatory variable need not be the 4 element information of the production 4 elements. The 4 element information of the production 4 elements is not quantitative data, but is handled as categorical data and subjected to category analysis, whereby the correlation between the objective variable and the explanatory variable can be calculated similarly to the actual measurement values of the industrial machine. By using the 4 element information of the production 4 elements as the explanatory variable, the operator can analyze the production 4 elements for the cause of the molding defect of the molded article.

Further, the objective variable may be an actual measurement value of the industrial machine, and the explanatory variable may be the actual measurement values of the industrial machine or the 4 element information of the production 4 elements. In other words, the operator may arbitrarily determine the objective variable and the explanatory variable. For example, since a plurality of control parameters such as an injection speed, a pressure, and a temperature at the time of molding are complicatedly related to each other in a production condition of the molded article, it is also necessary to analyze a correlation between the plurality of control parameters. By allowing the operator to arbitrarily determine the objective variable and the explanatory variable, it is possible to analyze, for example, a correlation between a plurality of control parameters relating to production conditions of the molded article. Therefore, it is possible to provide the molding management apparatus 500 having high convenience for the operator.

In the present embodiment, the time series data corresponding to the objective variable displayed in the objective variable display region RG1 and in the explanatory variable display region RG2 and the time series data corresponding to the explanatory variable displayed in the explanatory variable display region RG2 are displayed in a box plot diagram, which is an example of a statistical diagram. However, the time series data corresponding to the objective variables displayed in the objective variable display region RG1 and in the explanatory variable display region RG2 and the time series data corresponding to the explanatory variables displayed in the explanatory variable display region RG2 are not limited to the box plot diagram, and may be displayed in a graph representing a normal distribution, a line graph, a bar graph, or the like.

As described above, according to the present embodiment, the following effects can be obtained.

The molding management apparatus 500 includes the operation section 504 as a selection section for selecting an objective variable, the correlation calculation section 515 for calculating correlation between time series data corresponding to the objective variable and a plurality of time series data sets corresponding to explanatory variables explaining the objective variable, and the display section 503 for displaying the plurality of time series data sets corresponding to the explanatory variables in the display mode based on the correlation and displaying, along the time axis TA1, which is a common time axis, the time series data corresponding to the objective variable and the plurality of time series data sets corresponding to the explanatory variables displayed in the display mode based on the correlation. As a result, it is possible to provide the molding management apparatus 500 capable of allowing an operator to easily analyze a cause of a molding defect of the molded article.

2. Second Embodiment

A molding management apparatus 500 according to a second embodiment will be described with reference to FIG. 4. Note that the same configuration as in the first embodiment is denoted by the same reference numerals, and redundant description will be omitted.

The second embodiment is the same as the first embodiment except that the display mode based on the correlation calculated in step S2 is a display mode in which a plurality of sets of time series data corresponding to explanatory variables are rearranged and displayed based on the correlation.

Figure 4:
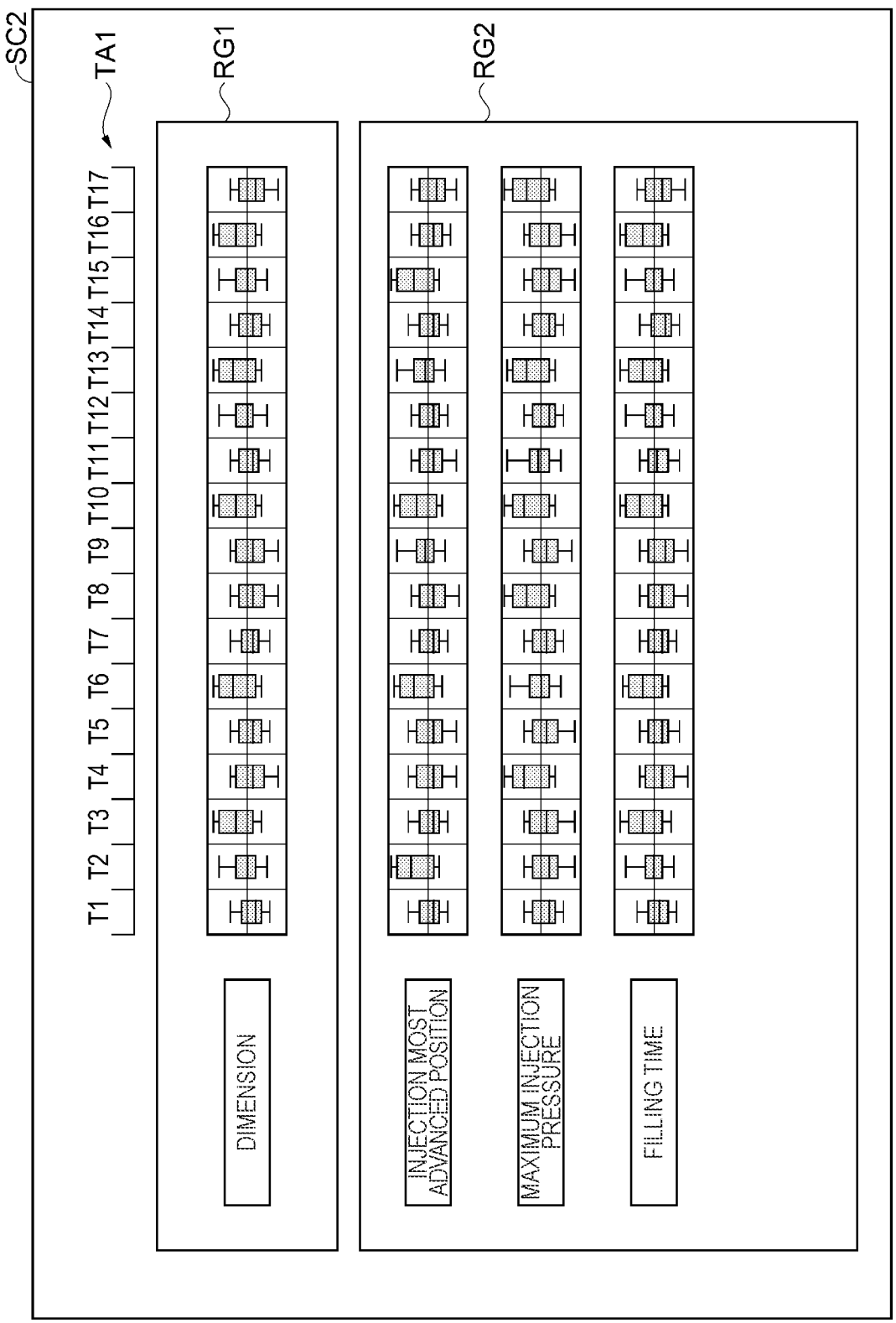
FIG. 4 is an explanatory diagram showing a display screen displayed by a display section according to a second embodiment.

FIG. 4 shows a display screen SC2 displayed by the display section 503 in step S3.

In the explanatory variable display region RG2, time series data corresponding to explanatory variables is displayed in a display mode based on the correlation calculated in step S2. In the present embodiment, the display mode based on correlation is a display mode in which a plurality of time series data sets corresponding to explanatory variables are sorted and displayed based on the correlation calculated in step S2. Specifically, the correlation based display mode is a display mode in which a plurality of sets of time series data corresponding to explanatory variables in which the absolute values of the correlation coefficients calculated in step S2 are larger than a preset reference value are rearranged and displayed in descending order of the absolute values of the correlation coefficients. For convenience of explanation, it will be assumed in the following description that the explanatory variables for which the absolute value of the correlation coefficient calculated in step S2 is larger than a preset reference value are, in descending order of the absolute value of the correlation coefficient, the most advanced position of injection of the molding apparatus 100, the maximum injection pressure of the molding apparatus 100, and the filling time of the molding apparatus 100. The most advanced position of injection of the molding apparatus 100, the maximum injection pressure of the molding apparatus 100, and the filling time of the molding apparatus 100 are examples of actual measurement values of an industrial machine.

In the explanatory variable display region RG2, a plurality of time series data sets corresponding to explanatory variables are displayed in descending order of the absolute value of the correlation coefficient from the top. In FIG. 4, in the explanatory variable display region RG2, the time series data of the most advanced position of injection of the molding apparatus 100, the time series data of the maximum injection pressure of the molding apparatus 100, and the time series data of the filling time of the molding apparatus 100 are displayed from the top in the order in which the absolute value of the calculated correlation coefficient is larger than a preset reference value.

As described above, in the present embodiment, since the display mode based on the correlation is a display mode in which a plurality of time series data sets corresponding to the explanatory variables are sorted and displayed based on the correlation calculated in step S2, the operator can obtain the same effect as in the first embodiment.

3. Third Embodiment

A molding management apparatus 500 according to a third embodiment will be described with reference to FIGS. 5, 6 and 7. Note that the same configuration as in the first embodiment is denoted by the same reference numerals, and redundant description will be omitted.

The third embodiment is the same as the first embodiment except that the display section 503 selects an explanatory variable based on the defect type corresponding to the objective variable and displays, in a display mode based on correlation, time series data of the explanatory variable selected based on the defect type corresponding to the objective variable.

Figure 5:
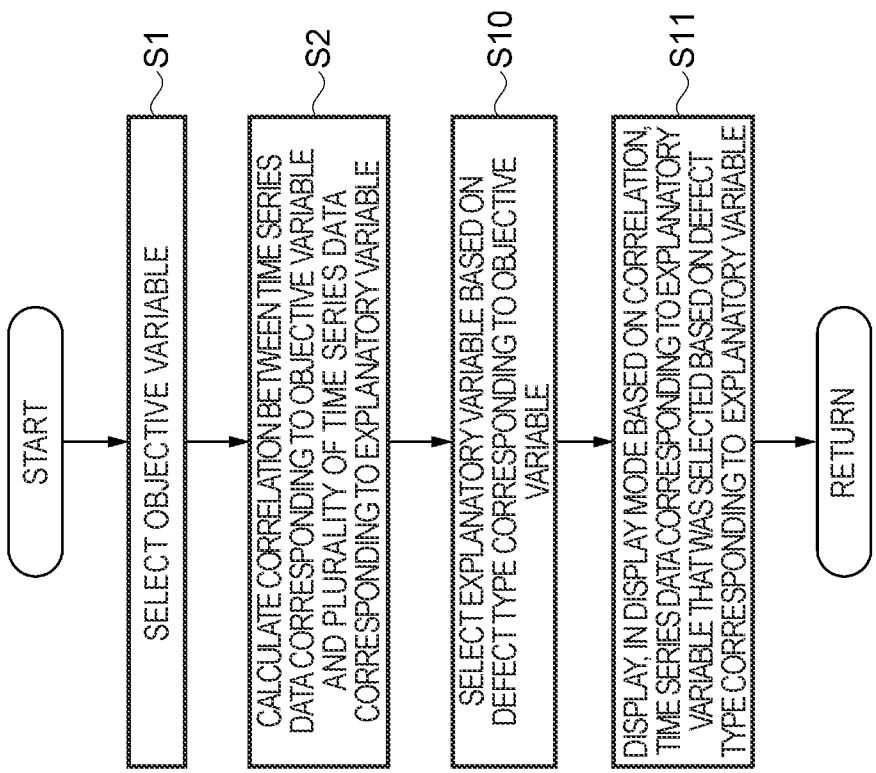
FIG. 5 is a flowchart showing a data processing method of a molding management apparatus according to a third embodiment.

As shown in FIG. 5, the data processing method of the molding management apparatus 500 includes step S1, which is a step of selecting an objective variable; step S2, which is a step of calculating a correlation between time series data corresponding to the objective variable and a plurality of time series data sets corresponding to the explanatory variable; step S10, which is a step of selecting an explanatory variable based on a defect type corresponding to the objective variable; and step S11, which is a step of displaying the time series data corresponding to the explanatory variable selected in step S10 in a display mode based on the correlation.

In step S10, the display control section 520 selects an explanatory variable based on the defect type corresponding to the objective variable. Then, in step S11, the display control section 520 controls the display section 503 to display time series data corresponding to the explanatory variable selected in step S10 in a display mode based on correlation.

Step S1 is a process of selecting an objective variable.

In this embodiment, the objective variable is information relating to the quality of the molded article. In the following description, for convenience of explanation, it is assumed that in step S1 the number of defects due to flow marks of the molded article is selected as an objective variable. The number of defects due to a flow mark of the molded article is the number of defects in which the type of defect of the molded article is a flow mark. The number of defects due to flow mark in the molded article is an example of information relating to the quality of the molded article.

Step S2 is a step of calculating a correlation between time series data corresponding to an objective variable and a plurality of time series data sets corresponding to explanatory variables.

The correlation calculation section 515 acquires, from the storage section 502, the time series data corresponding to the objective variable selected in step S1. In this embodiment, it is time series data in which the number of defects due to flow marks of molded article, which is an objective variable, is stored in time series.

The correlation calculation section 515 acquires, from the storage section 502, a plurality of time series data sets corresponding to explanatory variables explaining an objective variable. In the present embodiment, the explanatory variable is an actual measurement value of the industrial machine as in the first embodiment. However, the explanatory variable may be the 4 element information of the production 4 elements.

The correlation calculation section 515 calculates a correlation between the time series data corresponding to an objective variable acquired from the storage section 502 and the plurality of time series data sets corresponding to explanatory variables acquired from the storage section 502.

Step S10 is a step of selecting an explanatory variable on the basis of defect type corresponding to an objective variable.

The display control section 520 refers to Table TB1 shown in FIG. 6 to select an explanatory variable based on the defect type corresponding to the objective variable.

As shown in FIG. 6, Table TB1 is an example showing the correspondence between defect types corresponding to information related to the quality of molded article, and explanatory variables theoretically related to the defect types. Although not shown in the drawings, Table TB1 also describes the correspondence between other defect types, such as filling defects and flow marks, and explanatory variables theoretically related to these defect types. The explanatory variables described in Table TB1 are not limited to actual measurement values of industrial machines, and may include the 4 element information of the production 4 elements. Table TB1 is stored in the storage section 502 in advance, for example, in a database format.

As described above, in this embodiment, the objective variable is the number of defects due to a flow mark of the molded article. The display control section 520 selects explanatory variables based on flow mark, which is a defect type corresponding to an objective variable. Specifically, the display control section 520 refers to Table TB1, and selects explanatory variables theoretically related to flow marks. In this embodiment, explanatory variables which are theoretically related to flow marks are injection pressure of molding apparatus 100, maximum injection pressure of molding apparatus 100, injection speed of molding apparatus 100, continuous value of molding apparatus 100, most advanced position of injection of molding apparatus 100, and resin temperature of molding apparatus 100.

Step S11 is a step of displaying time series data corresponding to the explanatory variables selected in step S10 in a display mode based on correlation. The explanatory variables selected in step S10 are explanatory variables selected based on the defect type corresponding to the objective variable.

In the present embodiment, the display mode based on correlation is a display mode in which a plurality of time series data sets corresponding to explanatory variables are sorted and displayed based on the correlation calculated in step S2. Specifically, the correlation based display mode is a display mode in which a plurality of sets of time series data corresponding to explanatory variables in which the absolute values of the correlation coefficients calculated in step S2 are larger than a preset reference value are rearranged and displayed in descending order of the absolute values of the correlation coefficients.

In the following description, for convenience of description, it is assumed that explanatory variables for which the absolute value of the correlation coefficient calculated in step S2 is larger than a preset reference value are the maximum injection pressure of the molding apparatus 100, the injection speed of the molding apparatus 100, the most advanced position of injection of the molding apparatus 100, the resin temperature of the molding apparatus 100, the metal mold temperature of the molding apparatus 100, and the filling time of the molding apparatus 100. These explanatory variables are examples of actual measurement values of an industrial machine.

Among the explanatory variables selected in step S10, the explanatory variables for which the absolute value of the correlation coefficient calculated in step S2 is larger than a preset reference value are, in descending order of the absolute value of the correlation coefficient, the maximum injection pressure of the molding apparatus 100, the injection speed of the molding apparatus 100, the most advanced position of injection of the molding apparatus 100, and the resin temperature of the molding apparatus 100.

Figure 7:
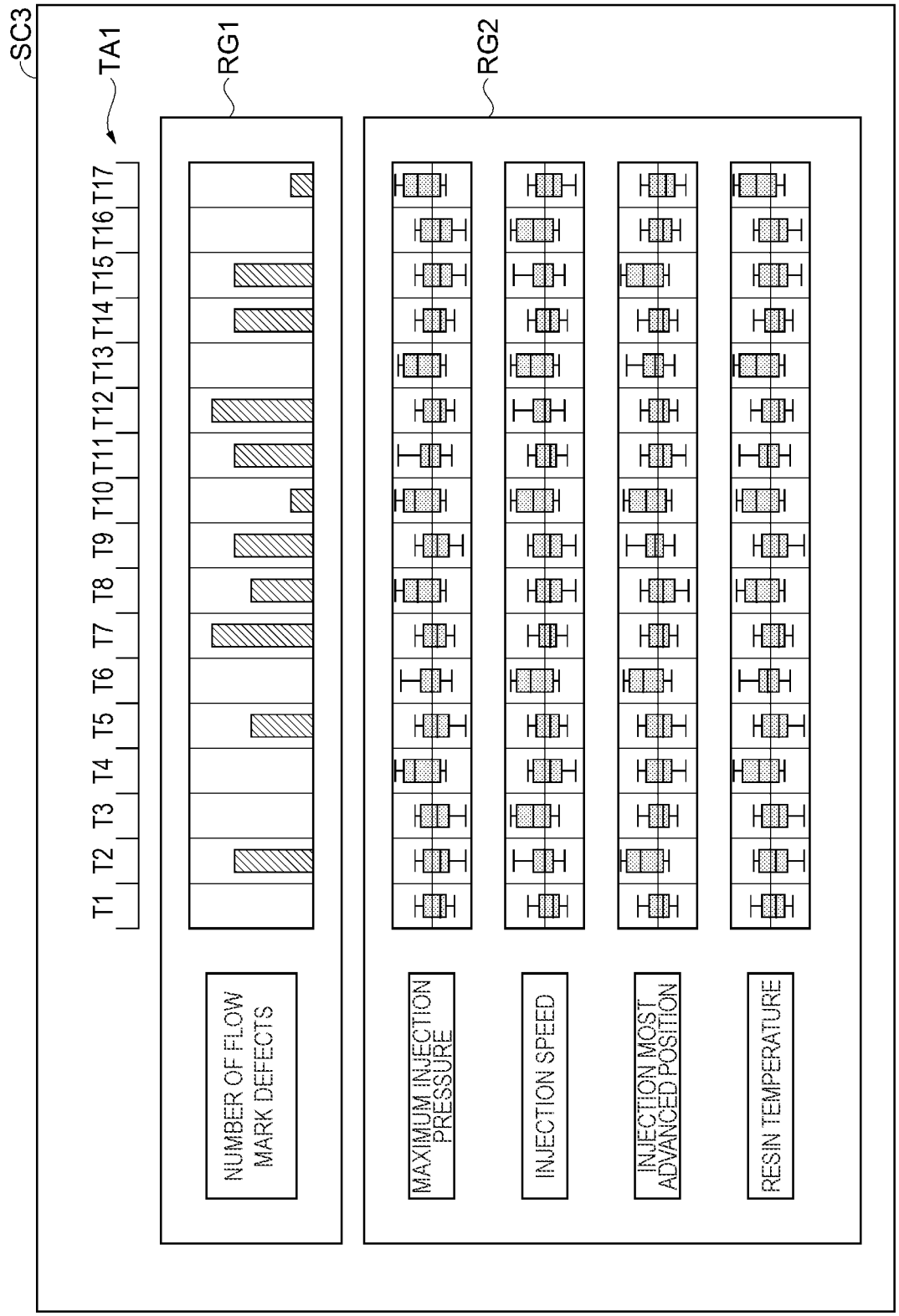
FIG. 7 is an explanatory diagram illustrating a display screen displayed by a display section according to the third embodiment.

FIG. 7 shows a display screen SC3 displayed by the display section 503 in step S11.

In the objective variable display region RG1, time series data corresponding to the objective variable selected in step S1 is displayed. In the present embodiment, as described above, since the number of defects due to a flow mark in the molded article is selected as an example of the objective variable in step S1, the time series data corresponding to the number of defects due to a flow mark in the molded article is displayed in the objective variable display region RG1.

In the explanatory variable display region RG2, time series data corresponding to the explanatory variable selected in step S10 is displayed in a display mode based on correlation. Specifically, time series data of the maximum injection pressure of the molding apparatus 100, the injection speed of the molding apparatus 100, the most advanced position of injection of the molding apparatus 100, and the resin temperature of the molding apparatus 100, which are, of the explanatory variables selected in Step S10, the explanatory variables for which the absolute value of the correlation coefficient calculated in step S2 is larger than a preset reference value, are displayed in descending order of the absolute value of the correlation coefficient from the top.

In this embodiment, since the time series data corresponding to the explanatory variable selected in step S10 is displayed in the explanatory variable display region RG2, from among the explanatory variables for which the absolute value of the correlation coefficient calculated in step S2 is larger than a preset reference value, the time series data of the metal mold temperature of the molding apparatus 100 and the filling time of the molding apparatus 100 are not displayed in the explanatory variable display region RG2. In addition, since the explanatory variables are displayed in a display mode based on the correlation calculated in step S2, among the time series data corresponding to the explanatory variables selected in step S10, the injection pressure of the molding apparatus 100 and the continuous value of the molding apparatus 100 are explanatory variables that have correlation coefficients whose absolute values are smaller than a preset reference value, so are not displayed in the explanatory variable display region RG2. In other words, the display section 503 displays, from among the time series data of 4 element information of the production 4 elements or actual measurement values of an industrial machine, which are explanatory variables, the time series data selected based on the defect type corresponding to the information related to the quality of the molded article, which is the objective variable.

According to the present embodiment, in addition to the effects of the first embodiment, the following effects can be obtained. In the present embodiment, in the explanatory variable display region RG2 is displayed time series data of explanatory variables that have a strong correlation with an objective variable and that theoretically relates to defect types of the molded article. Therefore, an operator can eliminate an explanatory variable not related to information relating to the quality of the molded article, which is an objective variable, and can easily analyze the cause of defective molding of the molded article.

What is claimed is:

1. A molding management apparatus configured to connect to a molding apparatus that produces a molded article, comprising:
   a selector which includes a keyboard, a mouse, or a touch panel, and through which an objective variable is selected;
   a processor that calculates a correlation coefficient between objective variable time series data corresponding to the objective variable and each of a plurality of explanatory variable time series data sets corresponding to explanatory variables for explaining the objective variable; and
   a display,
   the processor further controlling the display to display, from among the plurality of explanatory variable time series data sets, two or more of explanatory variable time series data sets each for which an absolute value of the correlation coefficient calculated at the processor is larger than a preset reference value,
   the processor further controlling the display to display, along a common time axis, the objective variable time series data and the two or more of explanatory variable time series data sets, and
   to display the two or more of explanatory variable time series data sets, the processor rearranging the two or more of explanatory variable time series data sets in a descending order of the absolute value, such that one of the two or more of explanatory variable time series data sets, which has the largest absolute value among the two or more of explanatory variable time series data sets, is displayed so as to be closest to the objective variable time series data among the two or more of explanatory variable time series data sets.

2. The molding management apparatus according to claim 1, wherein:
   the objective variable is information related to quality of the molded article, and
   the explanatory variables are actual measurement values of an industrial machine related to production of the molded article or are information on four production elements.

3. The molding management apparatus according to claim 2, wherein:
   the processor controls the display to display, from among the time series data of the actual measurement values of the industrial machine or the time series data of the information on the four production elements, time series data selected based on a defect type corresponding to the information related to the quality of the molded article.

4. The molding management apparatus according to claim 1, wherein
   the processor controls the display to display the two or more of explanatory variable time series data sets in a box plot diagram.

5. The molding management apparatus according to claim 1, wherein
   the objective variable is information relating to dimensions and appearance of the molded article.

6. A molding management apparatus configured to connect to a molding apparatus that produces a molded article, comprising:
   a processor that
      selects an objective variable, and
      calculates a correlation coefficient between objective variable time series data corresponding to the objective variable and each of a plurality of explanatory variable time series data sets corresponding to explanatory variables for explaining the objective variable; and
   a display,
   the processor further controlling the display to display, from among the plurality of explanatory variable time series data sets, two or more of explanatory variable time series data sets each for which an absolute value of the correlation coefficient calculated at the processor is larger than a preset reference value,
   the processor further controlling the display to display, along a common time axis, the objective variable time series data and the two or more of explanatory variable time series data sets, and
   to display the two or more of explanatory variable time series data sets, the processor rearranging the two or more of explanatory variable time series data sets in a descending order of the absolute value, such that one of the two or more of explanatory variable time series data sets, which has the largest absolute value among the two or more of explanatory variable time series data sets, is displayed so as to be closest to the objective variable time series data among the two or more of explanatory variable time series data sets.

7. The molding management apparatus according to claim 6, wherein
   the objective variable is information relating to dimensions and appearance of the molded article.

* * * * *